United States Patent
Everhart

(10) Patent No.: US 8,072,310 B1
(45) Date of Patent: Dec. 6, 2011

(54) SYSTEM FOR DETECTING AND MEASURING PARAMETERS OF PASSIVE TRANSPONDERS

(75) Inventor: Howard Richard Everhart, Winchester, CA (US)

(73) Assignee: Pulsed Indigo Inc., Winchester, CA (US)

( * ) Notice: Subject to any disclaimer, the term of this patent is extended or adjusted under 35 U.S.C. 154(b) by 833 days.

(21) Appl. No.: 12/156,535

(22) Filed: Jun. 2, 2008

Related U.S. Application Data

(60) Provisional application No. 60/942,031, filed on Jun. 5, 2007.

(51) Int. Cl.
*H04Q 5/22* (2006.01)
(52) U.S. Cl. ............ 340/10.1; 340/538.12; 73/862.41
(58) Field of Classification Search ........... 340/10.1, 340/572.1, 572.4, 572.5, 572.7, 572.8; 600/325, 600/327, 422, 423
See application file for complete search history.

(56) References Cited

U.S. PATENT DOCUMENTS

| | | | |
|---|---|---|---|
| 4,114,601 A | 9/1978 | Abels | |
| 4,531,526 A * | 7/1985 | Genest | 600/300 |
| 4,658,818 A | 4/1987 | Miller, Jr. et al. | |
| 5,057,095 A | 10/1991 | Fabian | |
| 5,081,457 A * | 1/1992 | Motisher et al. | 342/40 |
| 5,329,944 A | 7/1994 | Fabian et al. | |
| 5,433,115 A | 7/1995 | Spillman, Jr. et al. | |
| 5,456,718 A | 10/1995 | Szymaitis | |
| 5,581,249 A | 12/1996 | Yoshida | |
| 5,664,582 A | 9/1997 | Szymaitis | |
| 5,724,002 A * | 3/1998 | Hulick | 329/361 |
| 5,743,267 A | 4/1998 | Nikolic | |
| 6,026,818 A | 2/2000 | Blair | |
| 6,159,156 A | 12/2000 | Van Bockel | |
| 6,206,835 B1 | 3/2001 | Spillman, Jr. | |
| 6,309,350 B1 | 10/2001 | VanTassel | |
| 6,319,208 B1 | 11/2001 | Abita et al. | |
| 6,442,413 B1 | 8/2002 | Silver | |
| 6,476,708 B1 * | 11/2002 | Johnson | 340/10.34 |
| 6,638,231 B2 | 10/2003 | Govari et al. | |
| 6,682,490 B2 | 1/2004 | Roy et al. | |
| 7,123,129 B1 * | 10/2006 | Schrott et al. | 340/10.1 |
| 7,147,606 B1 | 12/2006 | Chang et al. | |
| 7,211,048 B1 | 5/2007 | Najafi et al. | |
| 2005/0006473 A1 * | 1/2005 | Deguchi et al. | 235/451 |
| 2006/0286938 A1 * | 12/2006 | Murdoch | 455/73 |
| 2007/0096881 A1 * | 5/2007 | Pillai | 340/10.51 |

* cited by examiner

*Primary Examiner* — Daniel Wu
*Assistant Examiner* — Frederick Ott
(74) *Attorney, Agent, or Firm* — Kirk A. Buhler; Buhler & Associates

(57) ABSTRACT

A detection and paramedic measuring system using a transponder composed of passive components and pulse inductive interrogation is disclosed. A methodology based on measuring the quality factor of the transponder is employed to detect a specific species of transponder or measure a parameter that alters the transponders quality factor.

12 Claims, 4 Drawing Sheets

SYSTEM FOR DETECTING AND MEASURING PARAMETERS OF PASSIVE TRANSPONDERS

CROSS-REFERENCE TO RELATED APPLICATION

This application claims the filing benefit under 35 U.S.C. §119(e) of U.S. Provisional Application No. 60/942,031, filed Jun. 5, 2007, which is herein incorporated by reference.

FEDERALLY SPONSORED RESEARCH

Not Applicable

CROSS-REFERENCE TO RELATED APPLICATIONS

Not Applicable

TECHNICAL FIELD

The primary field of application of the invention is the monitoring of physiological parameters or the detection of an object within a living organism.

BACKGROUND OF THE INVENTION

In-body wireless communications techniques are limited by the ability of living tissue to conduct electromagnetic energy. The generally accepted range of frequencies wherein attenuation by the tissue is acceptable is 40 kHz to less than 30 MHz. This range is also limited to a subset of frequencies where strong interfering signals such as AM radio, WWV, marine radio, etc. are minimal The practice is further limited by the need for both the transponder and monitoring equipment to be physically small. In the case of the transponder, the target application might be for example, monitoring the internal pressure of the bladder. In this case, the transponder will most likely be inserted through the urethra and thus must be small to avoid damaging the urethra during insertion. In the case of the monitoring equipment, the equipment may by necessity be handheld or patent worn to allow mobility. Particularly limiting is the physical size of the transmitter and receiver antennas. With the given spectrum constraints, these antennas must be less than the wave length of the target frequency and are usually of a loop design. Given this restraint, the electromagnetic energy transmitted has the electric field component almost completely suppressed leaving only the magnetic field. The field strength of the resulting inductive field is attenuated at a rate proportional to the inverse of the distance from the source raised to the third power. This in turn limits the useful range to short distances. However, for most applications communication over a distance of 24 to 30 inches is adequate.

Typical parametric monitoring applications include but are not limited to the following:
  Pressure in the bladder, veins and arteries, cranial cavity, etc.
  Strain induced in mechanical implants such as hip and knee replacements.
  Temperature at a specific body location or in a body cavity.
  Clinically significant chemicals concentrations such as oxygen, carbon dioxide, glucose, etc.
  Flow and transportation rates in vein and arteries, the gastric track, etc.

The second medical application is the detection of surgical implements inadvertently left behind in a surgical site, a situation that leads to a condition known as gossypiboma. Despite best efforts such as counting implements before and after a surgical procedure, it is not uncommon for implements to be left in the surgical wound. When the "counts" are found to be off, the common practice is to x-ray the patient to locate the missing implement and to this end implements have been designed to have radio-opaque markers. This subjects the patient to longer delays on the operation table and does not always detect the implement. It also fails to address the situation where the "count" is on but there is still an implement in the wound. This case is estimated cause 50 to 70% of the cases.

The current invention is applied to the problem by tagging each implement with a transponder. Before closing the surgical wound, the region is scanned with a handheld embodiment of the invention that simply indicates if a tagged implement is in the field. In order to be successful the system must always detect tagged implements while rejecting signals such as those from eddy currents induced in metal implants or signals from other sources.

RELATED ART

Several patents related to the monitoring of physiological parameters from within the body using radio frequency and/or inductive data transmission have been issued. Examples include U.S. Pat. No. 7,211,048 for conduit obstruction monitoring; U.S. Pat. No. 7,147,606 for urinary diagnostics; U.S. Pat. No. 6,682,490 for general body cavity monitoring; U.S. Pat. No. 6,638,231 for general body implantation; U.S. Pat. No. 6,442,413 for artery/vein monitoring; U.S. Pat. No. 6,319,208 for bladder urine monitoring; U.S. Pat. No. 6,309,350 for heart pressure/temperature monitoring; U.S. Pat. No. 6,159,156 for arterial monitoring: and U.S. Pat. No. 5,743,267 for heart monitoring.

Although each of these inventions have different yet sometimes overlapping intended uses, they all have one element in common that distinguishes them from the current invention and that is the use of active circuitry within the implanted transponder. This use of active circuitry requires some sort of power source within the transponder, either batteries or by induction from an outside power source. This limits these inventions as follows:

1) When batteries are used, the implant's useful life is limited to the battery life, while the minimum size of the implant is limited by the size of the battery.
2) When inductive power is used, the implant must have an induction coil large enough to supply power to the device at a distance from the power source. For large bodies, this distance may be upwards of 18 inches. The device must also have a rectifier and regulator to control the induced power. This again limits the minimum size of the implant.

An invention more closely related to the current invention is disclosed in U.S. Pat. No. 6,206,835. This invention is extended from earlier work disclosed in U.S. Pat. No. 5,581,249 and U.S. Pat. No. 5,433,115. The basis of the invention is the use of passive transponder composed of an inductor and capacitor forming a tank circuit. The resonate frequency of the tank circuit is then parametrically varied by modulating either the inductance or the capacitance. The parametric output is found by scanning a coil, located external to the body, across the frequency modulation band and detecting the frequency of peak energy absorbsion from the coil. This technique is commonly referred to as "transflection". This invention suffers from two problems. First, the excitation frequency must be scanned across the entire bandwidth of the transponder's modulation range for each reading of the transponder. A small modulation bandwidth allows for a quicker the scan but lowers the resolution. A large bandwidth provides more resolution but takes longer and allows more interference in the return signal. Secondly, with return signals that are on the order of one part per million of the drive signal requires an ultra stable interrogation drive amplitude and amplitude detection circuitry. Taken together the result is that even when fully optimized for scan time and resolution the system response time is not capable of capturing some rapidly changing physiological events.

Patents for inventions that are tailored to detecting the presents of a transponder in a field of interest vary widely as to technique. For example U.S. Pat. No. 5,664,582 and U.S. Pat. No. 5,456,718 uses a soft magnetic material as a tag, excites the tag with an inductive field and then attempts to detect high order harmonics generated in the tag material. Another pair of U.S. Pat. No. 5,329,944 and U.S. Pat. No. 5,057,095 use acoustic resonant tags that are detected using ultra sound techniques. U.S. Pat. No. 4,658,818 uses a battery powered transmitter as the tag and conventional receiving techniques for detection. In U.S. Pat. No. 4,114,601 the tag is made from a nonlinear magnetic material and excited by two different frequencies. The two excitation frequencies are mixed by the tag to yield a third frequency that is then detected.

The more closely related invention disclosed in U.S. Pat. No. 6,026,818 uses a transponder composed of an inductor and capacitor in a resonant tank circuit as a tag. The interrogation method excites the transponder by applying a burst of inductive coupled radio frequency signal. The center frequency and envelope of the burst is controlled such that all transponders within the field of interest and within a designated bandwidth are equally excited. At the end of the excitation burst, the transmit antenna is then shorted to damped out any residual energy and the receiver activated to detect the ringing of the transponder(s). Detection is based solely on a comparison of the received signal to a predetermined threshold level. The faults with this strategy are:

1) Since the output signal from the transponder starts to decay as soon as the excitation signal is terminated and several cycles are required to dampen the excitation signal, the received signal is be detected when the transponder output is much lower than the peak output.
2) The second problem with this invention is the simple threshold detection method. No matter how good the receiver filtering is, some energy from other sources will reach the detector. These may include energy from near by equipment, radio transmitters, wireless radio or paging systems and eddy current emissions from metallic objects required to be in the field such as surgical staples and implanted devices. The end result is need to trade off sensitivity and therefore detection distance for a reduction in false detections.

SUMMARY OF THE INVENTION

The current invention overcomes problems described in the prior art in two main ways: First, when used for parametric measuring, the problem of interrogation rate is solved in that the transponder is activated by a single magnetic pulse which can be only a few micro seconds in duration and the returned signal can be read in as little as a single period of the center frequency. This allows interrogation rates as high as half the systems center frequency. Second, since the parametric measurement is based on the return signal decay rate of the transponder, there are no particularly sensitive signal levels or frequency stability issues. The activating magnetic pulse can vary over a large range of magnitude and pulse width with little effect on the read back. Likewise, as the return signal presents to the receiver as a series of amplitude modulated pulses, standard receiving circuits can be used with few restraints. Since the demodulated receiver output is the decay rate envelope and decay rate is constant, a simple differentiator can be used to extract decay rate from the receiver output. The value of the parametric input can then be calculated and optionally converted to more usable parametric values.

The receiver restraints that do exist are that the transmitter's excitation pulse must not cause components in the receivers input or filter circuits to oscillate at a frequency at or near the center frequency of the system; and that the receiver should not deploy an automatic or other gain control system that affects the shape of the demodulated signal envelope.

When used as a "presents" detector, the invention overcomes problems pointed out with the prior art, again, by using a single magnetic pulse to activate the transponder and basing detection on the oscillation decay rate of the return signal. By using a single magnetic pulse to excite the transponder, no signal at the center frequency of the transponder is introduced into the system that interferes with the returned signal. This allows the receiver to detect the signal at the transponder's peak excitation. Since the transponders can be tailored to exhibit a specified quality factor within a specified manufacturing band, basing transponder detection on the oscillation decay rate of the excited transponder offers greater detection discrimination. Since the transponder has a known quality factor, the return signal's magnitude should decrease by a fix amount from one cycle to the next. Using a computational unit to measure this rate of decay over several signal cycles and several transponder interrogations allows the computational unit more accurately determine if the return signal is from a transponder or some other source. The process is almost identical to the parametric process except, here the end result is a go/no-go based on the degree of match between the transponders measured quality factor and the expected value.

DETAILED DESCRIPTION OF THE INVENTION

Figure 1:
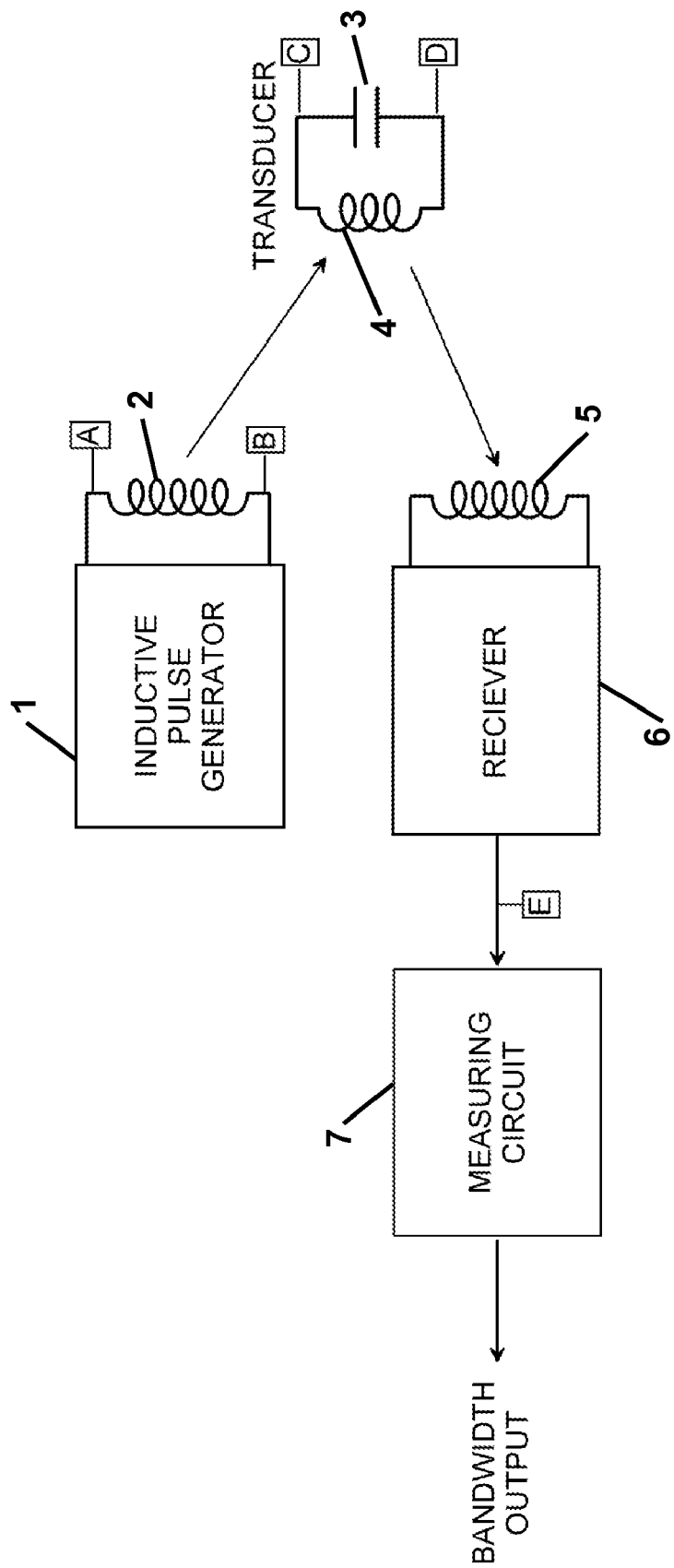
FIG. 1 is a block diagram showing the components of the system.

A block diagram of the overall system is shown in FIG. 1. Points on the diagram where signals of interest are found are marked with the boxed capital letters A through E. The voltage wave forms at these locations are shown under varying conditions in FIG. 2, with the same boxed capital letter annotation.

The descriptions for each element of FIG. 1 are as follows:
The inductive pulse generator or magneto-strictive transducer 1 switches on a drive voltage across an induction coil 2 causing a current flow to build up in the induction coil 2. The current flowing in the induction coil 2 creates a magnetic field in the space around the induction coil 2. When the current flowing in the coil 2 reaches a maximum value, the inductive pulse generator 1 switches off the drive voltage across the induction coil 2. The removal of the drive voltage across the induction coil 2 causes the magnetic field around the induction coil 2 to rapidly collapse resulting in a high rate of change in the magnetic field intensity.

The transponder is composed of a coil 4 tuned to the systems center frequency by capacitor 3. The transponder is either a mechanical resonator or a magnetic transducer. The coil 4 acts as both receive and transmit antenna. The capacitor 3 may be the self-capacitance of the coil 4 winding or a small monolithic capacitor with a low dissipation factor. The bandwidth of the transducer is determined by the resistance of the coil 4, the dissipation of the capacitor 3 and the combined parallel reactance of the coil 4 and capacitor 3.

The receiver 6 amplifies the voltage induced across the receiver antenna coil 5. The receiver 6 may be of a tuned radio frequency design or a direct conversion design. Amplitude detection is performed by any standard amplitude demodulation method.

The measuring circuit 7 generates an analog output signal proportional to the bandwidth of the transducer from the demodulated output of the receiver 6.

Figure 2:
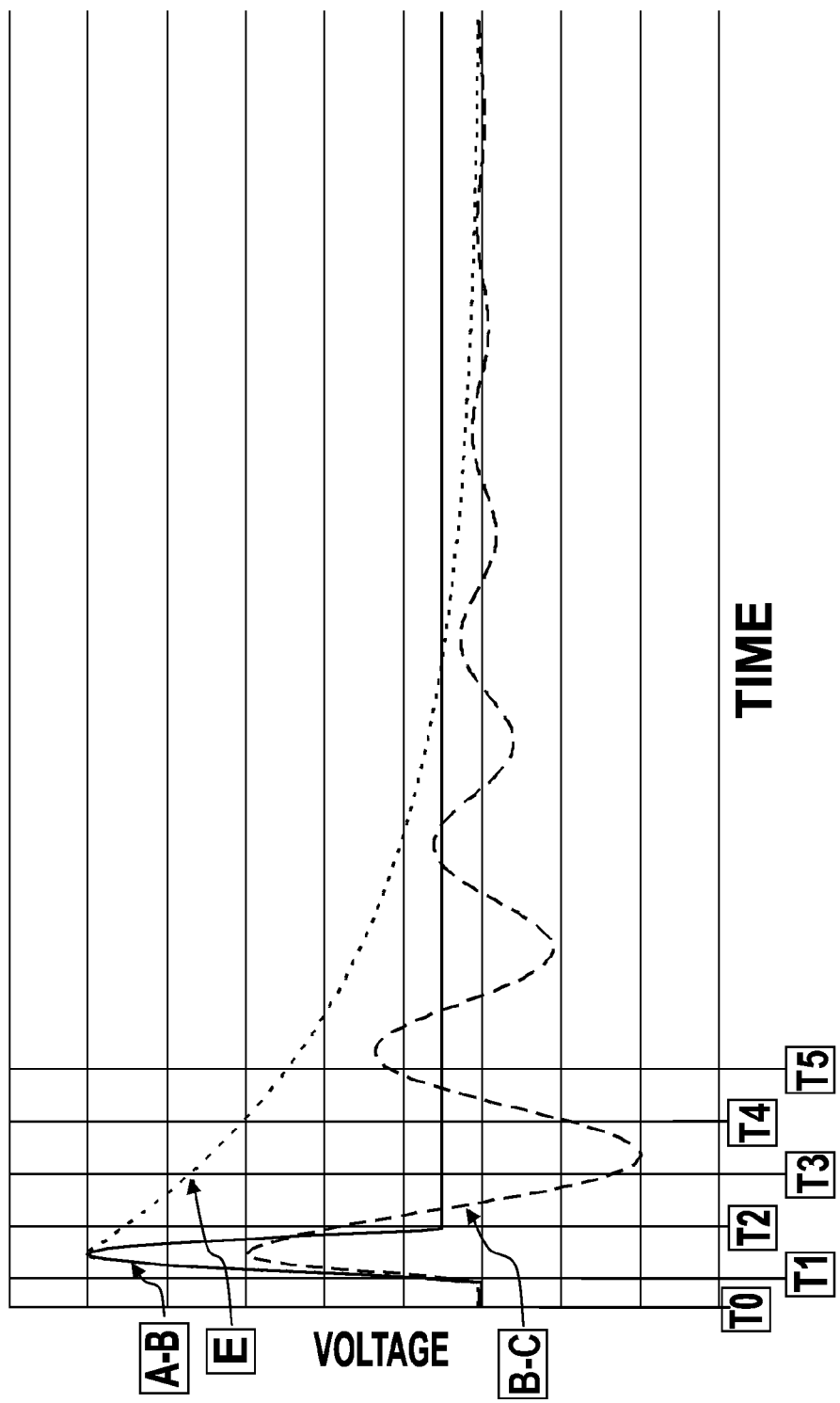
FIG. 2 represents the signals as marked on the block diagram.

Referring to FIG. 2, the trace labeled A is the drive voltage the inductive pulse generator 1 produces across the induction coil 2. The drive voltage is turned on at time TO and turned off at time T1. During the time period TO-T1 the current through the induction coil increases until a steady state condition is reached. The magnetic field generated by the current flowing through the induction coil 2 will permeate the surrounding area including the area occupied by the transducer coil 4. When the transducer drive voltage is terminated at time T1, the energy stored in the induction coil is dissipated across the induction coil's 2 resistance resulting in an extremely high current discharge rate. This is manifested by the high voltage back electro-motive force across the induction coil 2 and is accompanied by rapid rate of change in the induction coil's 2 magnetic field. This is shown on trace A as the time interval from T1 to T2.

The collapsing magnetic field of the induction coil 2 that encompasses the transducer coil 4 induces a voltage across the transducer coil 4. Since the transducer coil 4 is connected in parallel with transducer capacitor 3, the transducer will oscillate at the transducer's center frequency. The oscillation in the transducer will decay at a rate proportional to the transducer coil's 4 resistance and the transducer capacitor's 3 dissipation.

Oscillation in the transducer's coil produces a magnetic field which induces a signal across the receiver antenna 5. The receiver 6 amplifies the signal across the receiver coil 5 and then demodulates the amplified signal to produce an envelope of the transducer decay as indicated as trace E In FIG. 2.

The bandwidth of the transducer can be shown to be proportional to transducer's decay rate and therefore the transponder's bandwidth can be determined from the decay rate. The decay rate is constant and therefore the measuring circuit 7 can be a simple differentiator to generate an output proportional to the transducer's bandwidth.

Figure 3:
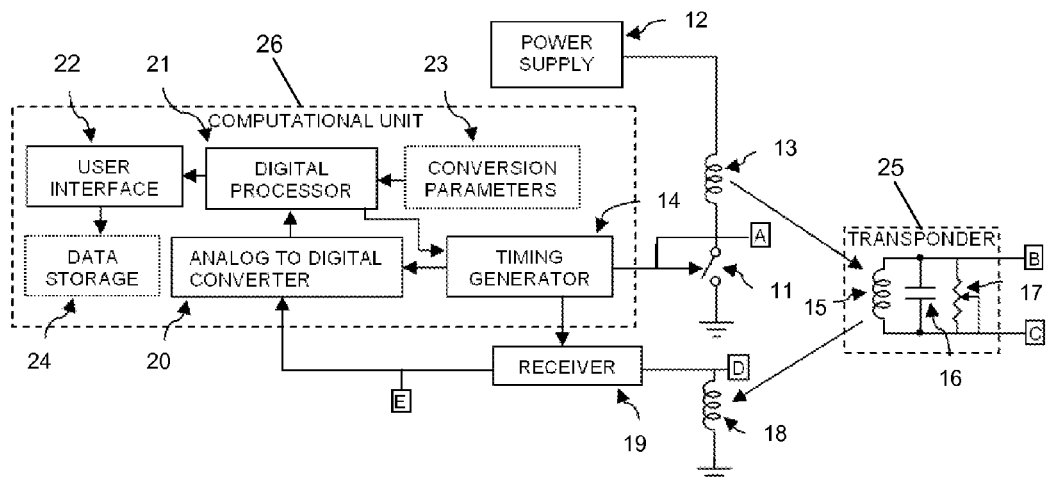
FIG. 3 is an alternate embodiment showing a block diagram of the components of the system.

The descriptions for each element of FIG. 3 are as follows:

The switch 11 is comprised of one or more MOSFET, Transistor or IGBT semiconductor devices. The switch 11 must be capable of handling currents in the range of 0.5 to 10 s of amperes and have a break down voltage range of 600 to several thousand volts.

The power supply 12 may be either wall supplied for stationary systems or a battery for mobile systems. Power supply 12 also powers the receiver 19 and the computational unit (connections not shown).

The transmit antenna 13 is a wire wound coil. The coil may be air core or may have a core of magnetic material. The typical coil diameter is 8 to 12 inches or an equivalent cross sectional area. The coil shape, number of turns and wire gauge may be adjusted for each application. In general, the characteristics are a high inductance, a low resistance and a self resonance an order of magnitude above or below the systems center frequency. The actual resonance may be adjusted by adding an external capacitance.

The timing generator 14 is part of the computational unit 26 and may be integral to a single chip micro processing unit (MPU). The timing unit 44 provides synchronization of the interrogation cycle.

The transponder 25 is composed of a coil 15 tuned to the systems center frequency by capacitor 16; and an incorporated element that is a parametric sensitive resistor 17.

The coil 15 acts as both receive and transmit antenna. It may have a ferromagnetic core or an air core. This component is the primary controlling factor of the transponders unloaded quality factor (Q) which is calculated as the ratio of the coils inductive reactance at the systems center frequency to the coils resistance. The coils shape and number of turns also affects the amplitude of the transponders response to a given excitation.

The capacitor 16 may be the self capacitance of the coil 15 winding or a small monolithic capacitor with a low dissipation factor.

The parametric resistor 17 may be a thermistor, a strain gauge, a resistive pressure sensor or any other sensor that changes resistance in response to a specific parameter. To be usable the resistor 17 must exhibit a good dynamitic range and have fairly large mean resistance value. For systems designed for "presents" detection the resistor 17 may be omitted or may be a fixed resistance used to trim the transponders Q to a target value.

The receiving antenna 18 is a coil similar to the transmit antenna 13. In some systems where cost is of major importance the same antenna coil may be used. In general, the receiving antenna coil 18 has a higher number of turns than the transmit antenna coil 13 to improve sensitivity and since it handles only modest currents a finer wire is used. Because the receiver antenna coil 18 is co-located with the transmit antenna coil 13, the transmitted excitation pulse will be strongly coupled to it so it must not be self resonate at or near the system center frequency.

The receiver 19 provides amplification and detection of the returned signal. The receiver 19 may be of a tuned radio frequency design or a direct conversion design. Super-heterodyne designs may be used but provide little improvement in performance. The receiver 19 input should not be tuned to the system's center frequency but should have a low pass or high pass filter that eliminates the self-resonate frequency of the receiver antenna coil 18. Additionally the input may require a limiter to keep the transmitter excitation pulse from saturating the amplifier. Tuning of the amplifier output before the detector can be used to increase sensitivity if the input amplifier is turned off or its input shorted out during the transmitter excitation period. Detection is performed by any standard amplitude modulation method. Alternately, the output of the receiver 19 amplifier may be sampled directly by the computational unit 26 and digital filtering and detection implemented therein.

The computational unit 26 encompasses a number of sub units.

The analog to digital converter 20 is part of the computational unit and may be integral to a single chip MPU. The analog to digital converters 20 sampling rate should be at least twice the systems center frequency and have a resolution of 12 bits or more.

The digital processor 21 controls interrogation cycle by setting the timing generator 14 parameters, reading the analog to digital converter 20 values and performing calculations that convert the data to parametric values. Calculation of the transponder Q is straight forward but conversion of the Q to the actual parameter being measured requires additional information. When such conversion is desired, the required conversion information is stored in the conversion parameters file 23. This file may be internal to the MPU or stored in a separate memory module. When a separate memory module is used it may be a fixed part of the computational unit 26 or a separate plug-in.

The computational unit also provides a user interface 22 where the acquired data can be displayed or alternately stored in a data storage unit 24 for later review.

Figure 4:
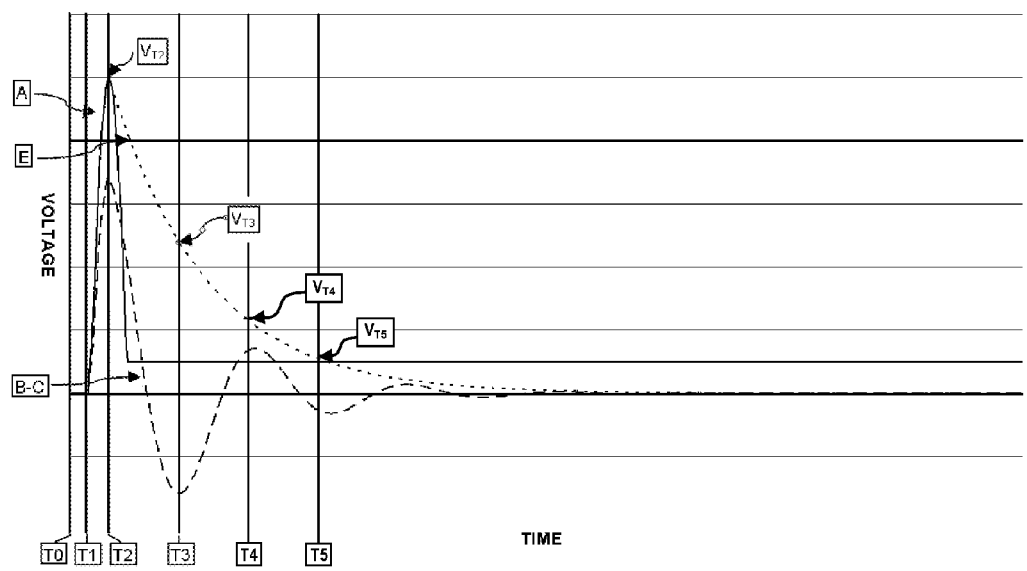
FIG. 4 represents the signal as marked in the block diagram for a transponder with a quality factor of 100.
Figure 5:
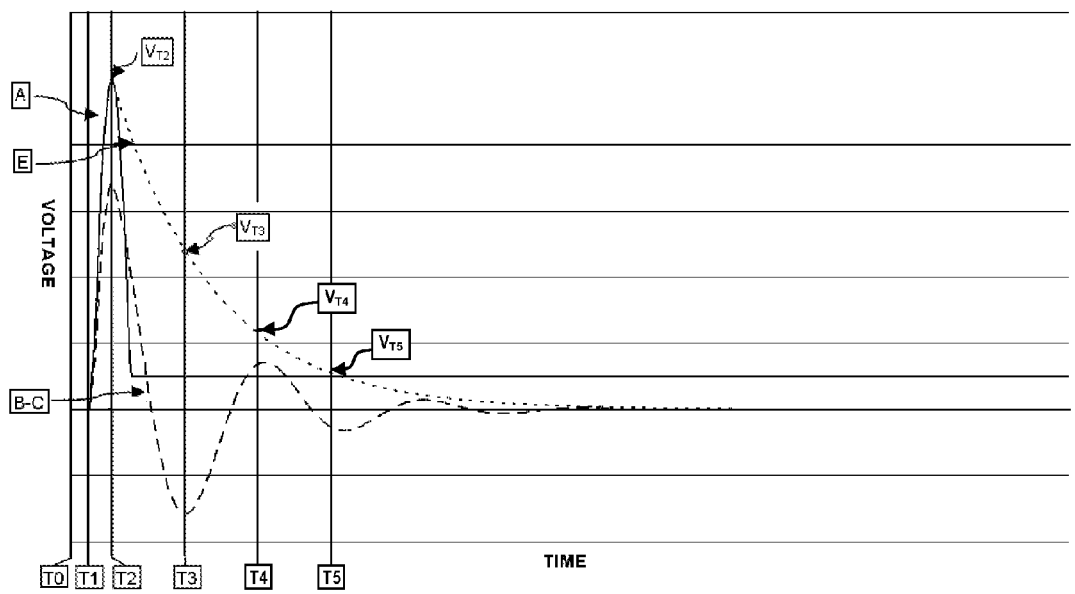
FIG. 5 represents the signal as marked in the block diagram for a transponder with a quality factor of 50.
Figure 6:
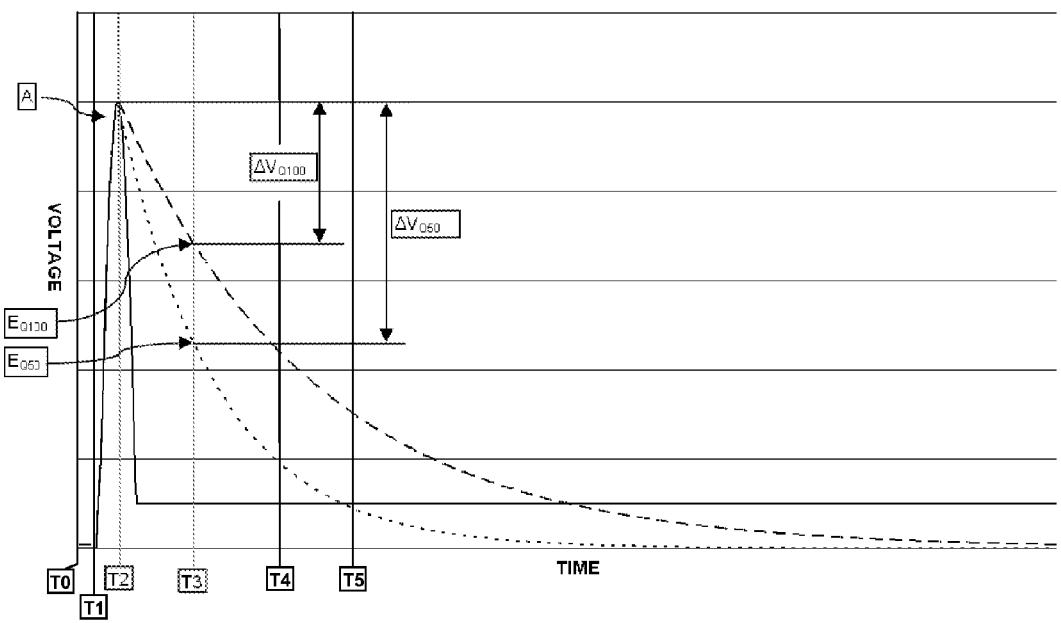
FIG. 6 represents an overlay of signals transponder having quality factors of 50 and 100.

Referring to FIGS. 4, 5 and 6, the transponder interrogation cycle starts with the timing generator 14 closing switch 11 at, time $T_0$. Closing switch 11, places the output voltage of the power supply 12 across the transmit antenna coil 13. The current in the transmit antenna coil 13 will increase at a rate calculated by $$i = i_{max} * (1 - e^{-t/(RT*L)})$$

Where

RT is the total resistance of the transmit antenna coil 13 and the switch 11

$I_{max}$ is the power supply 12 voltage divided by RT

L is the inductance of the transmit antenna coil e is the natural exponential and t is the switch on time In FIGS. 4, 5 and 6 the switch on time is indicated by $T_1$-$T_0$. The magnetic field surrounding the transmit antenna coil 13 increases with the current through it. For example, if the transmit antenna coil 13 is circular, the magnet field along its axis is calculated by $$B = (u_0 * i * n * a^2)/(2*(a^2 + r^2))^{3/2}$$

Where

B is the magnetic field $u_0$ is the permeability of free space i is the current through the transmit antenna coil 13 a is the radius of the transmit antenna coil 13 n is the number of turns in transmit antenna coil 13 and r is the distance along the axis where the magnetic field is measured

At time T1 the switch 11 is turned off and the current in the transmit antenna coil 13 is abruptly halted. A typical turn-off time for switch 11 ranges from 30 to 50 nanoseconds. When the current is stopped, the magnetic field collapses. From Faraday's Law of Induction it is known that the voltage induced in a coil is $$V = -n * (dB/dt)$$

Where

V is the induced voltage

N is the number of turns in the coil and dB/dt is the instantaneous rate of change of the magnetic field The collapsing magnetic field encompasses the transmit antenna coil 13, the receive antenna coil 18 and the transducer coil 15 and thus a voltage is induced across each of them. The time from T1 to T2 in FIGS. 4, 5 and 6 shows the voltage induced in the transmit antenna coil 13 on trace A and the voltage induced in the transducer coil 15 on trace B-C. The voltage induced into the receiver antenna coil 18 is similar to the transmit antenna coil 13 but with voltage ratio set by the turns ratio, that is, if the receive antenna coil 18 has ten times the number of turns as the transmit antenna coil 13, the induced voltage will also be ten times as large as the transmit antenna coil 13 voltage. The voltage induced across the transducer coil 15 varies based on its physical characteristics, distance from the transmit antenna coil 13 and the angle between the coils axis and the transmit antenna coils 13 axis. The voltage induced in the transponders coil 15 peaks with the change in magnetic flux and then oscillates at its tuned center frequency. The oscillations decay at a rate proportional to the quality factor of the transponder circuit 25. The oscillation in the transducer coil 15, induces a voltage in the receiver antenna coil 18 that is typically less than a milivolt in amplitude and cannot be detected until the voltage induced into the receive antenna coil 18 falls back to zero volts. This point is indicated in FIGS. 4, 5 and 6 as $T_2$. At this time the output of the receiver i.e. the demodulated signal is measured by the analog to digital converter 20 in the computational unit 26. Measurements are taken again at $T_3$, $T_4$ and $T_5$. Additional measurements may be taken as long as the detected signal exceeds the background noise level. These time intervals are equally spaced and the converted voltages are marked as $V_{T2}$, $V_{T3}$, $V_{T4}$ and $V_{T5}$ in FIGS. 4, 5 and 6.

The quality factor of the transponder 25 can be calculated from any given pair of the converted voltages by $$Q = (t_x - t_y)/\ln(V_x - V_y)$$

Where

Q is the quality factor $t_x$ is the time of voltage measurement $V_x$ $t_y$ is the time of voltage measurement $V_y$ and In is the natural logarithm The use of multiple sets of data point conversions improves the accuracy of the calculated measurement by allowing the detection of the noise level while averaging the calculated Q's. Averaging the data points over multiple interrogation cycles also improves the accuracy.

The Q of the transponder without the sensor resistance is known to be $$Q = X/R_s$$

Where

Q is the quality factor

X is the reactance of the transponder coil 15 at the transponders resonate frequency and $R_s$ is the series resistance of the transponder coil 15

For calculation purposes converting Rs to its equivalent parallel value is preferred which is $$R_p = (X^2 + R_s^2)/R_s$$

Where
$R_p$ is the equivalent parallel resistance
X is the transducer coil 15 reactance at resonance
and
$R_s$ is the series resistance of the transponder coil 15
When the sensor resistance 17 is added to the transponder 25, it is in parallel with the equivalent parallel resistance so that the total resistance is calculated as $$R = (R_p * R_x)/(R_p + R_x)$$

Where
R is the total resistance across the transponders 25 resonate circuit
$R_p$ is the equivalent parallel resistance of the transducer coil 15
and
$R_x$ is the resistance of the sensor resistor 17
By combining the above equations the value of Rx can be obtained by calculating $$R_x = (Q*X*R_p)/((Q*X) + R_p)$$

Where
$R_x$ is the unknown resistance of the sensor 17
Q is calculated from the measured values
$R_p$ is the effective parallel resistance of the transponder coil 15
and
X is the reactance of the transponder coil 15

Thus in order for the computational unit 26 to calculate the resistance of the sensor 17, the transponder coil 15 reactance and series resistance must be known in addition to the measured Q. These values can be stored in a conversion parameters unit 23. To convert the calculated sensor resistance 17 to a parametric value the conversion parameters unit 23 must also contain parameters that relate the parameter being measured to the sensor resistance 17. Alternately the conversion parameters may contain a table of values for direct conversion of Q to a parametric value or coefficients for a curve fitting equation to calculate the parametric value. When offline processing is implemented, the calculated Q values may be stored in the data storage unit 24 and off loaded later for conversion. The data storage unit 24 can also be used to store internally converted real time data. When detection only is required, the conversion parameters unit 23 need only store the minimum and maximum Q to accept as a detected transponder. If the transponder's Q is in range the user is notified via the user interface 22.

In FIG. 6 the response curves from FIG. 4 and FIG. 5 and overlaid. The difference between a transponder having a quality factor of $E_{Q100}$ and $E_{Q50}$ is visible with the voltage difference $\Delta V_{Q100}$ and $\Delta V_{Q50}$ at T3 and as the signals discharge to zero volts.

What is claimed is:

1. A wireless passive transponder system, comprising:
    an inductively activated passive transponder which has a known resonate center frequency and bandwidth;
    an inductive pulse generator which excites said transponder using a single magnetic pulse thereby causing said transponder to oscillate at said resonate center frequency;
    a receiver which includes an amplitude modulation detector which extracts a demodulated signal of said oscillation of said transponder;
    a measuring circuit which converts a decay rate of said demodulated signal to said transponder's bandwidth;
    a computational unit which replaces or augments said measuring circuit;
    said computational unit controls a sequencing of pulses from said inductive pulse generator to form a collection of said receiver's output data to form an interrogation cycle;
    said computational unit averages or processes multiple said interrogation cycles to reduce noise to improve measurement accuracy of said transducer bandwidth, and
    said computational unit uses multiple randomly varying times between said interrogation cycles thereby reducing interference from background signals to improve measurement accuracy of said transducer bandwidth.

2. The system according to claim 1, wherein said transponder comprises an inductor and capacitor in parallel resonance shunted by a parametric sensitive resistance such that said transponder's bandwidth is varied there by forming a parametric measuring transponder.

3. The system according to claim 1, wherein said transponder is comprised of a mechanical resonator activated with a magnetic transducer.

4. The system according to claim 1 that further includes a loop antenna which is an integral part of said inductive pulse generator and alternately said loop antenna being shared with said receiver.

5. The system according to claim 1 wherein said computational unit functions as said amplitude modulation detector.

6. The system according to claim 1 wherein said computational unit has a storage interface with prerecorded characteristics of said transponder, thereby allowing said computational unit to convert said transducer bandwidth to a parameter value for storage and/or display.

7. A wireless parametric measuring system comprising:
    an electromagnetic passive resonate transponder with an incorporated element that alters said transponder's resonate bandwidth or quality factor based on a parameter being measured;
    an inductive pulse generator and antenna that excites said transponder causing said transponder to ring at a resonate frequency;
    a receiver and an antenna that detects said ringing of said transponder and measures a decay rate to determine a resonate bandwidth;
    wherein said excitation and said receive antennas are combined into a single element;
    wherein said center frequency and bandwidth of said transponder is fixed and said system is used to detect the presence of said transponder in a detection field where multiple transponders may be present;
    wherein each transponder from said multiple transponders has a different center frequency;
    a computational or display element that provides access to said resonate bandwidth to provide parametric data regarding said electromagnetic passive resonate transponder(s), and
    said computational element averages or processes multiple interrogation cycles to reduce noise to improve measurement accuracy of said transducer bandwidth.

8. The wireless parametric measuring system according to claim 7 wherein said transponder is composed of an inductor and a capacitor in parallel resonance shunted by a parametric sensitive resistance.

9. The wireless parametric measuring system according to claim 7 wherein said computational unit is supplied with predefined known characteristics of transponder that allow said computational unit to convert said detected bandwidth to said measured parameter to matching predefined known characteristics.

10. The wireless parametric measuring system according to claim 7 wherein said parametric data is stored in either raw or converted format in said computational element for later playback.

11. The wireless parametric measuring system according to claim 7 wherein said resonate bandwidth has a center frequency for each transponder.

12. The wireless parametric measuring system according to claim 7 wherein said incorporated element is a parametric resistive sensitive element.

* * * * *